(12) United States Patent  
Ingram

(10) Patent No.: US 6,371,325 B1
(45) Date of Patent: Apr. 16, 2002

(54) FUEL TANK CLOSURE WITH CAP-EJECTOR SPRING

(75) Inventor: Murray Alec Ingram, Emsworth (GB)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/623,825

(22) PCT Filed: Mar. 10, 1999

(86) PCT No.: PCT/US99/05213

§ 371 Date: Nov. 13, 2000

§ 102(e) Date: Nov. 13, 2000

(87) PCT Pub. No.: WO99/46177

PCT Pub. Date: Sep. 16, 1999

(30) Foreign Application Priority Data

Mar. 10, 1998 (GB) .............................................. 9804948

(51) Int. Cl.$^7$ .............................................. B65D 41/04
(52) U.S. Cl. .................... 220/290; 220/212.5; 220/295; 220/DIG. 33
(58) Field of Search ................................ 220/290, 295, 220/212.5, DIG. 33; 215/222, 332

(56) References Cited

U.S. PATENT DOCUMENTS 3,968,897 A * 7/1976 Rodgers ...................... 220/204
4,051,975 A * 10/1977 Ohgida et al. ............... 220/203
4,304,339 A * 12/1981 Sakai et al. .................. 220/209
4,887,733 A * 12/1989 Harris ......................... 220/203

FOREIGN PATENT DOCUMENTS

DE 4041536 6/1992

* cited by examiner

Primary Examiner—Stephen K. Cronin
(74) Attorney, Agent, or Firm—Barnes & Thornburg

(57) ABSTRACT

A fuel tank closure system (10) includes a filler neck (12) and a fuel cap (14) engageable with filler neck (12). Fuel cap (14) includes a closure (16), a seal (18) coupled to closure (16) to engage filler neck (12), and a spring (20). Closure (16) includes a handle (24) and a lug (34) engageable with filler neck (12). Handle (24) is adapted to move lug (34) between an engaged position securing closure (16) in an axially and a disengaged position permitting closure (16) to move between axially inner and outer positions. Spring (20) moves closure (16) relative to filler neck (12) to the axially outer position while lug (34) is in the disengaged position.

19 Claims, 2 Drawing Sheets

FUEL TANK CLOSURE WITH CAP-EJECTOR SPRING

BACKGROUND AND SUMMARY OF THE INVENTION

This application claims priority to British Patent Application Serial No. 9804948.9, filed Mar. 10, 1998, which is expressly incorporated by reference herein.

This invention relates to a fuel cap for a filler neck of a tank such as the fuel tank of a motor vehicle of the type in which lugs on the fuel cap are brought into engagement with complimentary formations on the filler neck by relative angular movement about the central axis of the filler neck. The invention is particularly, but not exclusively, applicable to fuel caps of the type having a bayonet connection to the filler neck.

In recent years, there has been a tendency to design fuel caps of the type described above so as to minimize the range of angular movement of the fuel cap to cause full engagement with the filler neck. This has created a risk that a user may inadvertently fail to secure the fuel cap properly with the result that it could become dislodged when the vehicle is in motion.

According to the invention, a fuel cap of the type described above has a compression spring adapted to engage with the filler neck so as to cause outward movement of the fuel cap relative to the filler neck in the event that the lugs on the fuel cap are not in engagement with the complimentary formations on the filler neck.

If the fuel cap is of the type which normally lies flush with the adjacent surface of the vehicle body when secured, the compression spring may be arranged to cause displacement of the fuel cap to a position which is visibly proud of the vehicle body. Similarly, if the fuel cap is located behind a flap which, when closed, lies flush with the adjacent surface of the vehicle body, the spring may be arranged to cause outward displacement of the fuel cap to such an extent that the flap cannot be closed.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
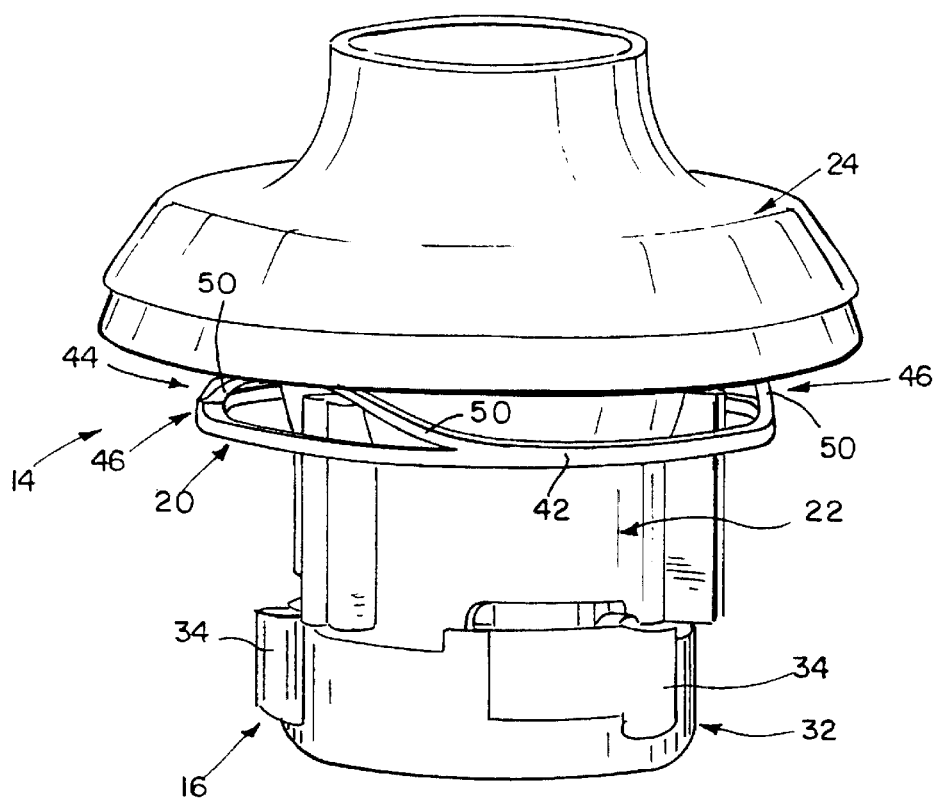
FIG. 1 is a perspective view of a fuel cap in accordance with the invention showing the fuel cap aligned with, but spaced apart from, an end of a filler neck.
Figure 1:
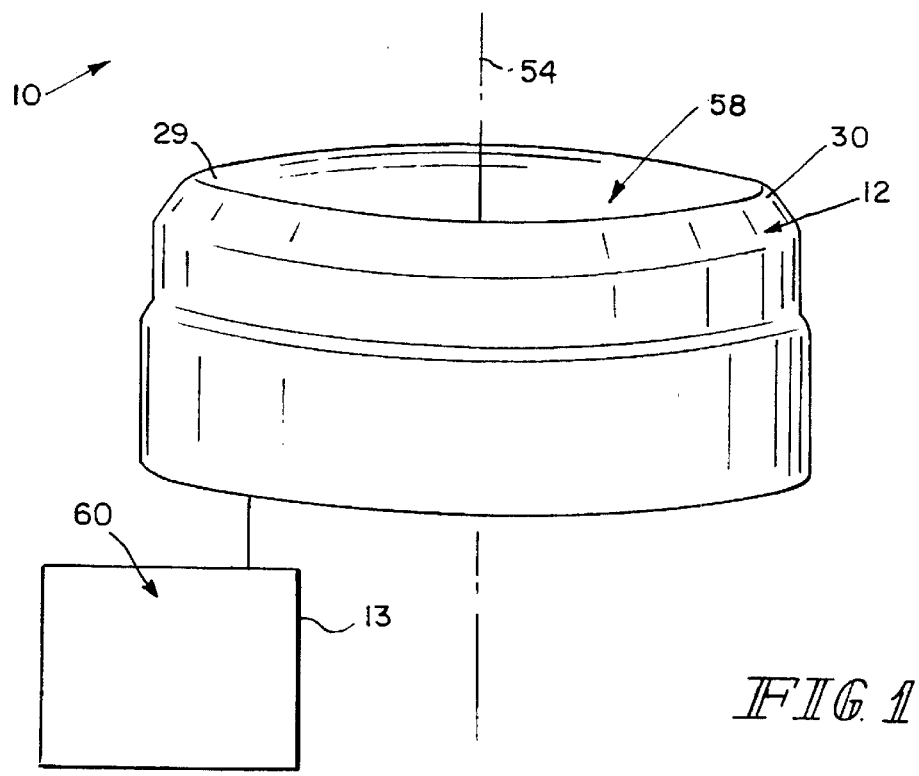
Figure 2:
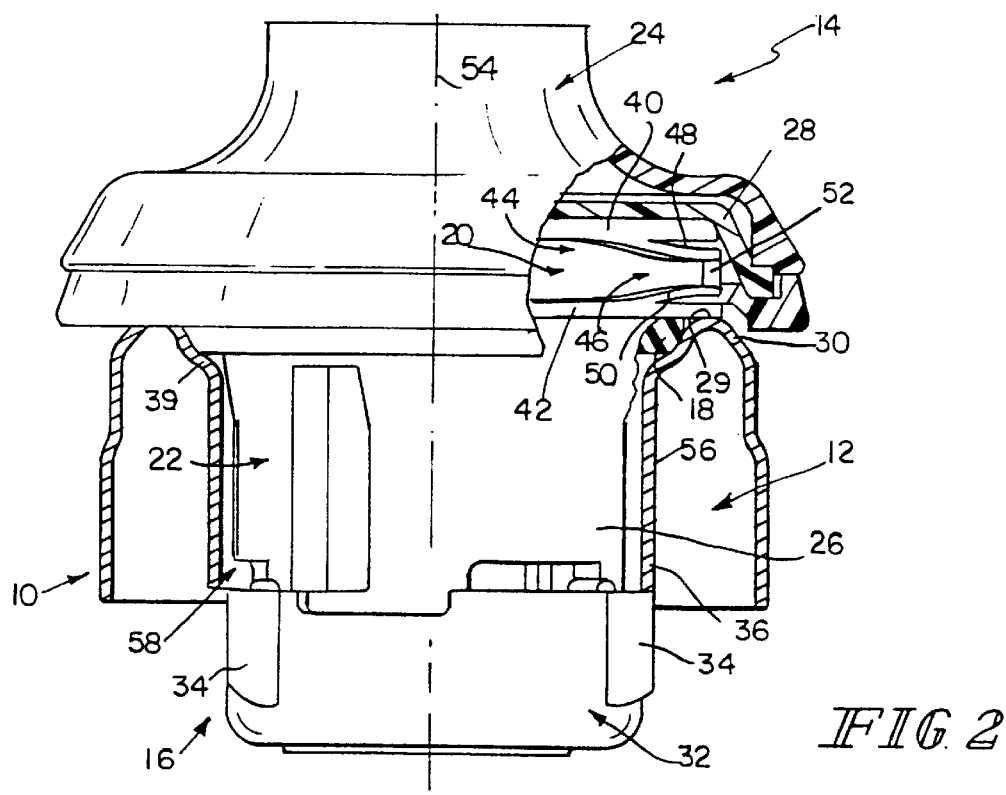
FIG. 2 is a side view of the fuel cap and filler neck of FIG. 1, with portions broken away, showing the fuel cap fully engaged with the filler neck.

The drawings show a fuel tank closure system 10 including filler neck 12 of a fuel tank 13 and a fuel cap 14 engageable with filler neck 12. Fuel cap 10 includes a closure 16, a seal 18 coupled to closure 16, and a compression spring 20 coupled to closure 16. Closure 12 includes a core 22 positioned to extend through a passageway defined by spring 20 and a handle 24 coupled to core 22. Core 22 includes a body member 26 sized to be received in filler neck 12, a flange 28 which projects over an end 30 of filler neck 12, and a locking bar 32 having lugs 34 which engage with complementary formations 36 on filler neck 12. When lugs 34 are in engagement with complementary formations 36 of filler neck 12, seal 18 on closure 16 engages with a tapered formation 39 on end 28 of filler neck 12, as shown in FIG. 2.

In accordance with the disclosure, compression spring 20 engages flange 28 of closure 12 and an axially outer surface 29 on end 30 of filler neck 12. Compression spring 20 comprises a plastics molding having a ring-shaped upper head member 40 abutting against flange 28, a ring-shaped lower foot member 42 abutting against end 30 of filler neck 12, and a integrally molded flexible connector 44 that interconnects head and foot members 40, 42. Flexible connector 44 includes a pair of diametrically spaced-apart flexible body members 46 that each include a first pair of curved arms 48 coupled to head member 40, a second pair of curved arms 50 spaced apart from first pair of arms 48 and coupled to foot member 42, and a web member 52 coupled to and positioned to lie between first and second pair of curved arms 48, 50. First pair of arms 48 are convex in an axially inner direction along a central axis 54 of filler neck 12 and second pair of arms 50 are convex in an axially outer direction along central axis 54.

Figure 3:
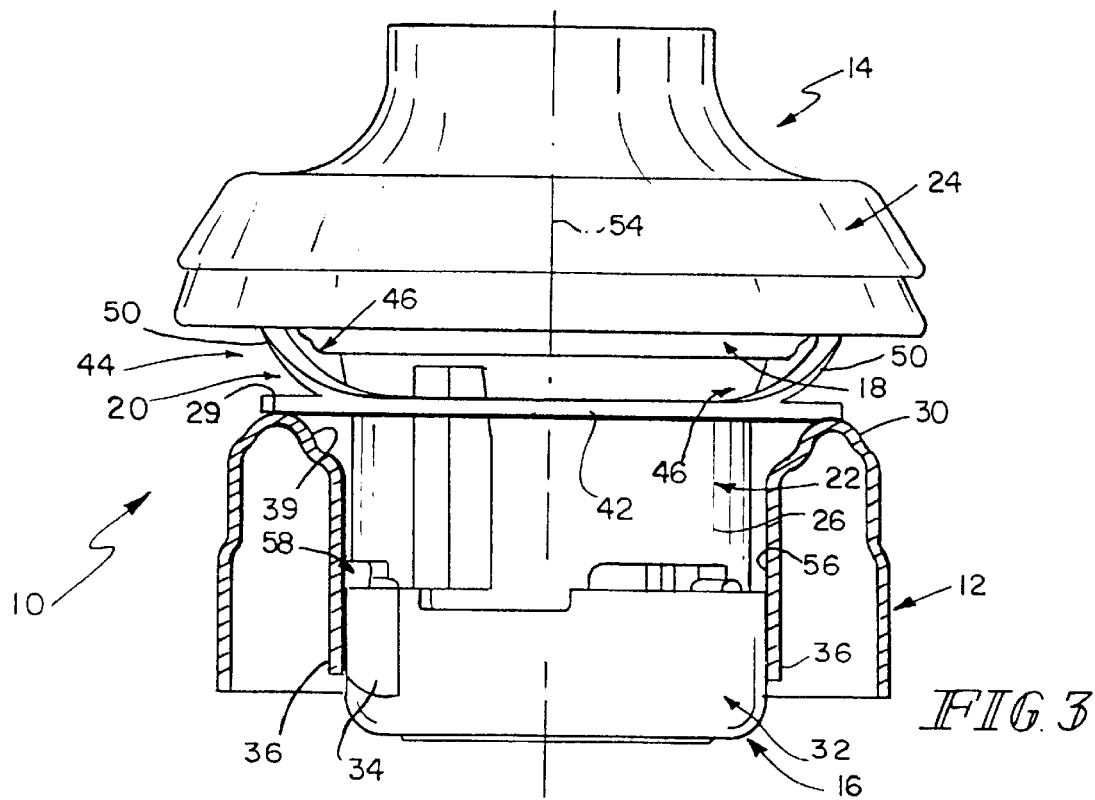
FIG. 3 is a side view of the fuel cap and filler neck of FIG. 1, with portions broken away, showing the fuel cap inserted into the filler neck but not secured therein.

Filler neck 12 includes central axis 54 and an inner side wall 56 defining a hollow 58 in communication with an interior region 60 of fuel tank 13. If closure 16 is in an axially inner position along central axis 54 so that core 22 is fully inserted into hollow 58 of filler neck 12 and lugs 34 on locking bar 32 are in an engaged position so that lugs 34 are in engagement with complementary formations 36 on filler neck 12, spring 20 is compressed so that flange 28 is in close proximity to end 30 of filler neck 12, as shown in FIG. 2. If handle 24 is moved and lugs 34 are in a disengaged position so that lugs 34 are not in engagement with complementary formations 36 on filler neck 12, closure 16 is movable between the axially inner position and an axially outer position and spring 20 moves flange 28 to a spaced-apart position from end 30 of filler neck 12, with closure 16 and seal 18 moved to an axially outer position along central axis 54, as shown in FIG. 3.

What is claimed is:

1. A fuel tank closure system comprising
a filler neck having a central axis and an inner wall defining a hollow interior in fluid communication with an interior region of a fuel tank and
a fuel cap engageable with the filler neck of a vehicle fuel tank, the fuel cap including a closure, a seal coupled to the closure to engage the filler neck, and a spring, the closure including a core and a handle coupled to the core, the core including a body member sized to be received in the filler neck and a lug coupled to the body member and engageable with the filler neck, the handle being adapted to move the lug between an engaged position securing the closure in an axially inner position along the central axis and a disengaged position permitting the closure to move between the axially inner position and an axially outer position along the central axis, the spring being positioned to abut the closure and the filler neck to move the closure relative to the filler neck to the axially outer position while the lug is in the disengaged position.

2. The system of claim 1, wherein the filler neck includes an axially outer surface and the spring engages the axially outer surface of the filler neck.

3. The system of claim 1, wherein the spring is a compression spring.

4. The system of claim 3, wherein the spring is coupled to the closure.

5. A fuel tank closure system comprising a filler neck having a central axis and an inner wall defining a hollow interior in fluid communication with an interior region of a fuel tank and a fuel cap engageable with the filler neck of a vehicle fuel tank, the fuel cap including a closure and a seal coupled to the closure to engage the filler neck, the closure including a core and a handle coupled to the core, the core including a body member sized to be received in the filler neck and a lug coupled to the body member and engageable with the filler neck, the handle being adapted to move the lug between an engaged position securing the closure in an axially inner position along the central axis and a disengaged position permitting the closure to move between the axially inner position and an axially outer position along the central axis, the fuel cap further including means abutting the filler neck for moving the closure relative to the filler neck to the axially outer petition while the lug is in the disengaged position.

6. The system of claim 5, wherein the moving means includes a head member coupled to the closure, a foot member engageable with the filler neck, and a flexible connector including two spaced-apart flexible body members integrally coupled to the head and foot members.

7. The system of claim 5, wherein the moving means includes a spring positioned to lie between the closure and the filler neck.

8. The system of claim 7, wherein the spring is coupled to the closure and engages the filler neck.

9. The system of claim 7, wherein the core is positioned to lie within the spring.

10. A fuel tank closure system comprising a filler neck having a central axis and an inner wall defining a hollow interior in fluid communication with an interior region of a fuel tank and a fuel cap engageable with the filler neck of a vehicle fuel tank, the fuel cap including a closure, a seal coupled to the closure to engage the filler neck, and a spring, the closure including a core and a handle coupled to the core, the core including a body member sized to be received in the filler neck and a lug coupled to the body member and engageable with the filler neck, the handle being adapted to move the lug between an engaged position securing the closure in an axially inner position along the central axis and a disengaged position permitting the closure to move between the axially inner position and an axially outer position along the central axis, the spring including a foot member engageable with the filler neck, a head member engageable with the closure, and a flexible connector coupled to the foot member and the head member to move the closure relative to the filler neck to the axially outer position while the lug is in the disengaged position.

11. The system of claim 10, wherein the foot member is ring-shaped.

12. The system of claim 10, wherein the head member is ring-shaped.

13. The system of claim 10, wherein the flexible connector is made of plastics material and integral with the head and foot members.

14. The system of claim 10, wherein the flexible connector includes spaced-apart flexible body members.

15. The system of claim 14, wherein the body members are diametrically spaced-apart.

16. The system of claim 14, wherein each flexible body member includes a first pair of arms coupled to the head member, a second pair of arms coupled to the foot member, and a web member coupled to the first and second pair of arms.

17. The system of claim 16, wherein the first pair of arms are convex in an axially inner direction along the central axis and the second pair of arms are convex in an axially outer direction along the central axis.

18. The system of claim 16, wherein first pair of arms are spaced apart from the second pair of arm.

19. The system of claim 16, wherein each web member is positioned to lie between the respective first and second pair of arms.

\* \* \* \* \*